Nov. 29, 1932.  V. W. LEONARD  1,889,607

AUTOMATIC PRESSURE REGULATOR

Filed Dec. 16, 1931

Inventor:
Vincent W. Leonard,
by Charles E. Tullar
His Attorney.

Patented Nov. 29, 1932

1,889,607

UNITED STATES PATENT OFFICE

VINCENT W. LEONARD, OF SAUGUS, MASSACHUSETTS, ASSIGNOR TO GENERAL ELECTRIC COMPANY, A CORPORATION OF NEW YORK

AUTOMATIC PRESSURE REGULATOR

Application filed December 16, 1931. Serial No. 581,349.

My invention relates to automatic pressure regulators particularly to pressure regulators used in an electrically driven installation where it is desirable to automatically maintain a pressure within certain limits, and has for its object the provision of an automatic pressure regulator employing novel means for varying the pressures at which the regulator will respond as well as for varying the range between the pressures at which the regulator will respond.

The control switch of the usual pressure regulator employs a diaphragm responsive to varying pressures for opening and closing the switch. A spring is usually provided to oppose the effect of the pressure upon the diaphragm and to determine the pressures at which the switch will operate. These regulators can be adjusted to maintain various different pressures on a system and can also be so adjusted that the range of pressures, that is the difference in the pressures at which the switch opens and closes, may be varied. It has been customary to employ different means which involve the use of a plurality of compression springs for making each of these adjustments.

It is an object of my invention to provide a pressure regulator making use of only one compression spring the characteristics of which can be adjusted to vary the pressures at which the device responds as well as the range, thereby simplifying the adjusting mechanism.

In the preferred embodiment of my invention I provide a regulator with an electric switch and a lever for actuating the switch. A diaphragm subjected to a varying pressure is arranged to operate the lever to open the switch and a compression spring opposing the opening movement of the switch is arranged to operate the lever to close the switch when the pressure on the diaphragm is below a predetermined value. The switch is of the snap-action type.

I provide an adjusting screw for varying the compression of the spring to change the pressures at which my device will operate. I also provide a unique device for engaging the spring by which the effective length and hence the stiffness of the spring can be changed to vary the range of my device. By changing the stiffness of the spring the force necessary to bring about a given change in length of the spring also varies. The ratio of the force to the change in length for the different degrees of stiffness may be termed the resilient gradients of the spring. Thus, with a single spring I can vary both the pressures at which the device will operate and the range of operation.

Figure 1:
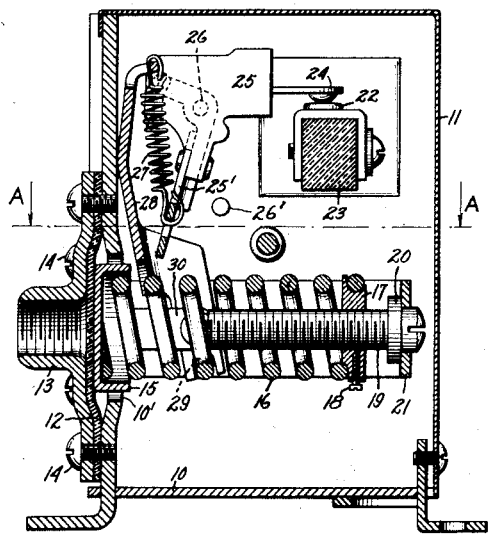
Figure 2:
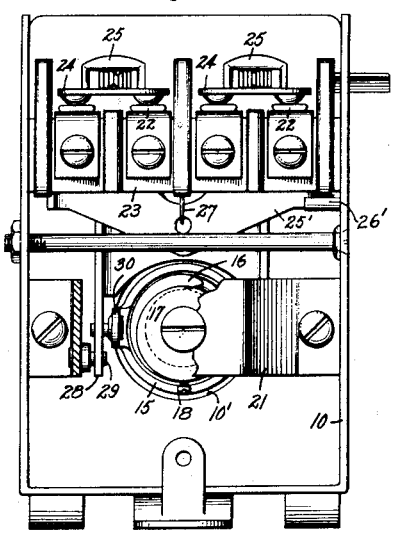
Figure 3:
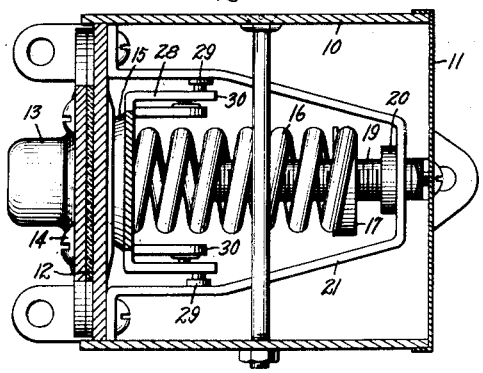

Referring to the drawing Fig. 1 shows a cross-section taken through the center of my device; Fig. 2 shows a front view thereof with cover removed; and Fig. 3, a sectional view of my invention taken on line A—A of Fig. 1 to show the lever operating mechanism.

Referring to Figs. 1 and 2, the casing 10 having an opening 10′ therein is provided with a cover 11 removable therefrom. A rubber diaphragm 12 is held against the casing 10 over the opening 10′ by means of the threaded flange member 13 which is fastened to the casing 10 by suitable screws 14. Engaging the rubber diaphragm through opening 10′ is the cup member 15 in which one end of the compression spring 16 is fitted.

The spring 16 has operably connected therewith at one end thereof the adjusting nut 17 provided with a set-screw 18 for preventing rotation between the stud 19 and the adjusting nut 17. The stud 19 is provided with a flange 20 abutting the yoke 21, the compression of the spring 16 maintaining the stud 19 in engagement with the yoke 21.

It will be seen that by loosening the set-screw 18 and rotating the stud 19 with respect to nut 17 the compression in the spring 16 may be varied. By rotating the adjusting nut 17 with respect to the spring 16, the nut 17 can be adjusted to engage any one of the coils of the spring 16, thus varying the effective length of the spring.

The switch mechanism comprises the stationary contacts 22 mounted upon the stationary support 23 of the insulating material. The movable contact members 24 are carried by a member 25 pivoted at 26. This member is connected by means of element 25′ and the spring 27 to the lever 28 mounted in the pivots 29 (see Fig. 3) carried by the yoke 21. As top member 26' limits counterclockwise movement of member 25. This provides an over center snap-action switch. Movement of the lever 28 about the pivot 29 causes a snap action of the movable contacts 24 in a well known manner.

The cup member 15 carries thereon the vertical arms 30 pivotally engaging the lever mechanism 28. When the diaphragm 12 moves outwardly in response to pressure it moves the lever 28 clockwise about its pivot to open the contacts 24. When the diaphragm returns to the position shown in Fig. 1, the contacts are again closed by spring 16.

During operation of the device if it is desired to increase the pressures at which the switch contacts will be opened and closed the stud 19 is rotated with respect to nut 17 to increase the compression in the spring 16. A greater pressure must then be exerted upon the diaphragm 12 before the contacts will be opened and conversely the contacts will be closed at a higher pressure. If it is desired to vary the range between the pressures at which the contacts will be opened and closed the range may be increased by rotating the adjusting nut 17 with respect to the spring to move it to the left, to decrease the effective length of the spring. Conversely to decrease the range between the pressures at which the switch will open and close, the adjusting nut is moved to the right to increase the effective length of the spring.

Thus, it will be seen that I have provided a simple and effective adjusting means for varying the pressures and the range of operation of my device.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. A regulator including an electric switch, a device operated in accordance with variations in pressure operably connected with said switch for opening and closing the same at different pressures, a resilient member opposing the actuation of said switch by said device, and means for varying the resilient gradient of said member to change the range between the pressures at which said switch is opened and closed.

2. A regulator including an electric switch, a device operated in accordance with variations in pressure operably connected with said switch, a resilient member opposing the actuation of said switch by said device, means for varying the compression in said member to vary the pressures at which said pressure responsive device will open and close said switch, and other means operably engaging said member for varying the resilient gradient of said member to change the range between the pressures at which said switch is opened and closed.

3. A regulator including an electric switch, a device operated in accordance with variations in pressure operably connected with said switch, a resilient member opposing the actuation of said switch by said device, means for varying the compression in said member to vary the pressures at which said pressure responsive device will open and close said switch, and other means for varying the effective length of said member to change the range between the pressures at which said switch is opened and closed.

4. A regulator including an electric switch, a device responsive to variations in pressures operably connected to said switch, a spring opposing the actuation of said switch by said device, means for varying the compression in said spring to vary the pressures at which said pressure responsive device will open and close said switch, and other means operably associated with said spring to vary the effective length thereof to change the range between the pressures at which said switch is opened and closed.

5. A regulator including an electric switch, a diaphragm responsive to varying pressures and operably connected to said switch to open and close the same at different pressures, a spring for opposing movement of said diaphragm in one direction, a member engaging the coils of said spring and adjustable with respect thereto for varying the effective length of said spring to vary the range between the pressures at which said switch is opened and closed.

6. A regulator including an electric switch, a diaphragm responsive to varying pressures, said diaphragm being operably connected with said switch, a spring for opposing movement of said diaphragm in one direction, means for varying the compression in said spring to vary the pressures at which said pressure responsive device will open and close said switch, and a member engaging the coils of said spring and adjustable with respect thereto for varying the effective length of said spring to vary the range between the pressures at which said switch is opened and closed.

7. A regulator including an electric switch, a diaphragm responsive to varying pressures operably connected to said switch, a helical coil spring engaging said diaphragm and opposing movement thereof, a circular member provided with grooves at a circumference thereof for engaging said helical spring, a screw engaging said circular member, said circular member being axially movable with respect to said screw for varying the compression in said spring to vary the pressures at which said switch will be opened and closed by said diaphragm, said circular member having relative movement with respect to the coils in said spring whereby the effective length of said spring may be varied to vary the range between the pressures at which said switch will be opened and closed by said diaphragm.

8. A regulator including an electric switch, a diaphragm operatively connected to said switch and responsive to varying pressures for operating said switch, a spring engaging said diaphragm for opposing movement of said diaphragm in response to said pressures, a nut provided with a threaded circumference for engaging said spring, a screw engaging said nut, said nut being axially movable with respect to said screw for varying the compression of said spring to vary the pressures at which said pressure responsive device will open and close said switch, said nut being movable relative to said spring for changing the effective length thereof whereby the range between the pressures at which said switch will be opened and closed can be varied.

In witness whereof, I have hereunto set my hand.

VINCENT W. LEONARD.